United States Patent [19]
Maybon

[11] Patent Number: 5,896,902
[45] Date of Patent: Apr. 27, 1999

[54] DEBARKING KNIFE AND METHOD OF MANUFACTURING IT

[75] Inventor: Guy Maybon, Saint Jorioz, France

[73] Assignee: Technogenia S.A., Saint Jorioz, France

[21] Appl. No.: 08/889,501

[22] Filed: Jul. 8, 1997

[30] Foreign Application Priority Data

Jul. 12, 1996 [FR] France ................... 96 09059

[51] Int. Cl.[6] .................... B27L 1/00; B27G 13/00; C23C 14/30; B27M 1/00
[52] U.S. Cl. ................ 144/329; 148/334; 148/335; 148/663; 144/208.1; 144/208.8; 144/218; 144/241; 407/103; 425/596
[58] Field of Search .............. 219/121.6; 427/596; 148/334, 335, 663, 621; 144/162.1, 174, 176, 208.1, 208.8, 208.4, 218, 241, 329, 340, 341; 407/48, 103

[56] References Cited

U.S. PATENT DOCUMENTS

| | | | |
|---|---|---|---|
| 4,200,669 | 4/1980 | Schaefer et al. | 427/596 |
| 4,353,756 | 10/1982 | Van der Root | 148/663 |
| 4,852,622 | 8/1989 | Eriksson | 144/241 |
| 5,168,907 | 12/1992 | Herrington et al. | 144/241 |
| 5,653,274 | 8/1997 | Johnson et al. | 144/241 |

FOREIGN PATENT DOCUMENTS

| | | |
|---|---|---|
| 2078355 | 3/1994 | Canada. |
| 319926 | 6/1989 | European Pat. Off.. |
| 3437983 | 3/1986 | Germany. |
| 3808285 | 9/1989 | Germany. |
| 4134144 | 6/1993 | Germany. |
| 1073063 | 3/1989 | Japan. |

*Primary Examiner*—W. Donald Bray
*Attorney, Agent, or Firm*—William H. Eilberg

[57] ABSTRACT

A debarking knife includes a plate having at least one sharp debarking edge delimited by a leading face and a trailing face. The leading face is reinforced by an anti-abrasion hard surface coating having better anti-abrasion qualities than the substrate forming the plate. The anti-abrasion hard surface coating is preferably a mixture of grains of fused tungsten carbide bound by an Ni/Cr/B/Si alloy, the whole being brazed to the substrate using a laser beam.

9 Claims, 4 Drawing Sheets

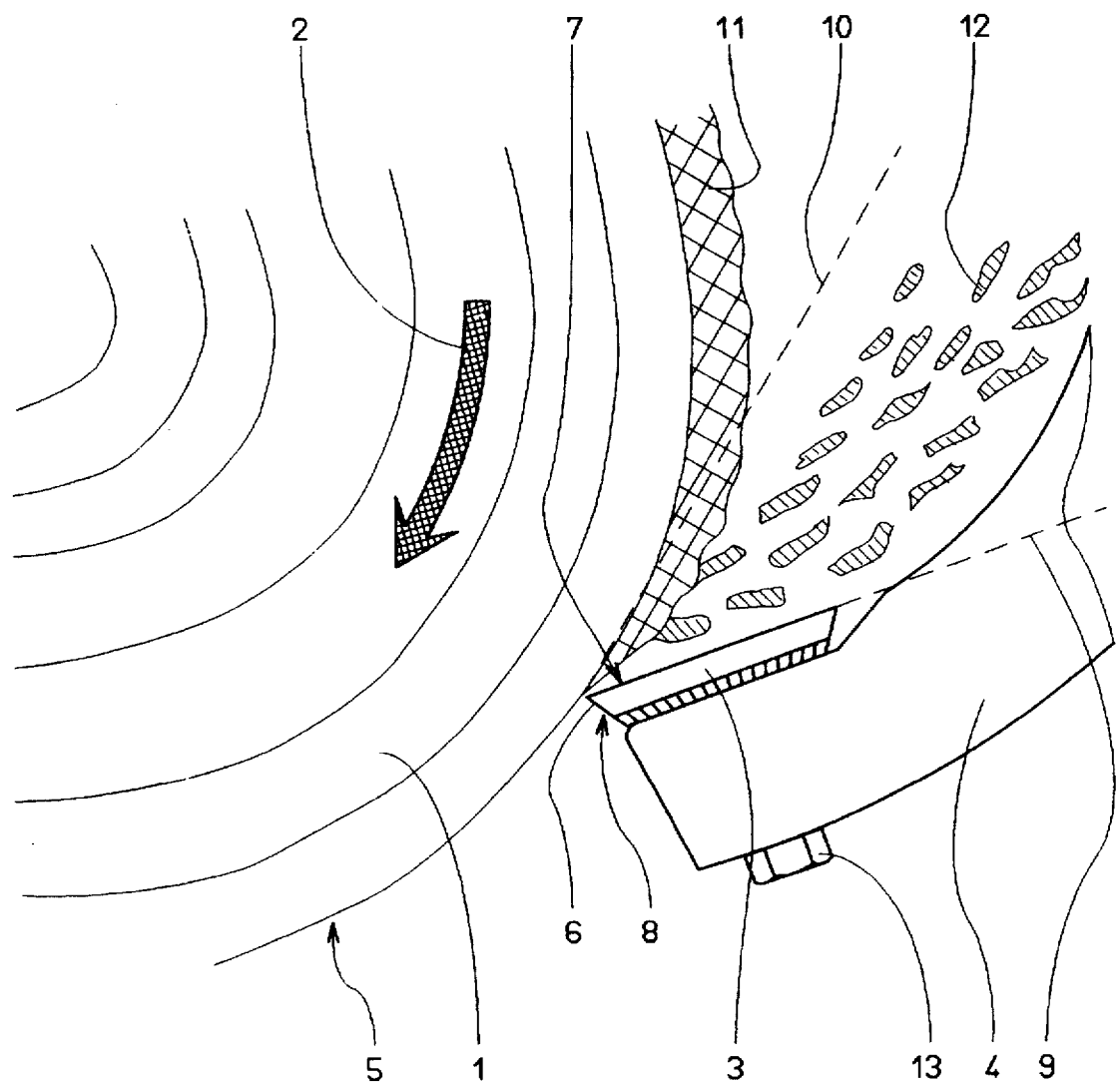
Fig_1

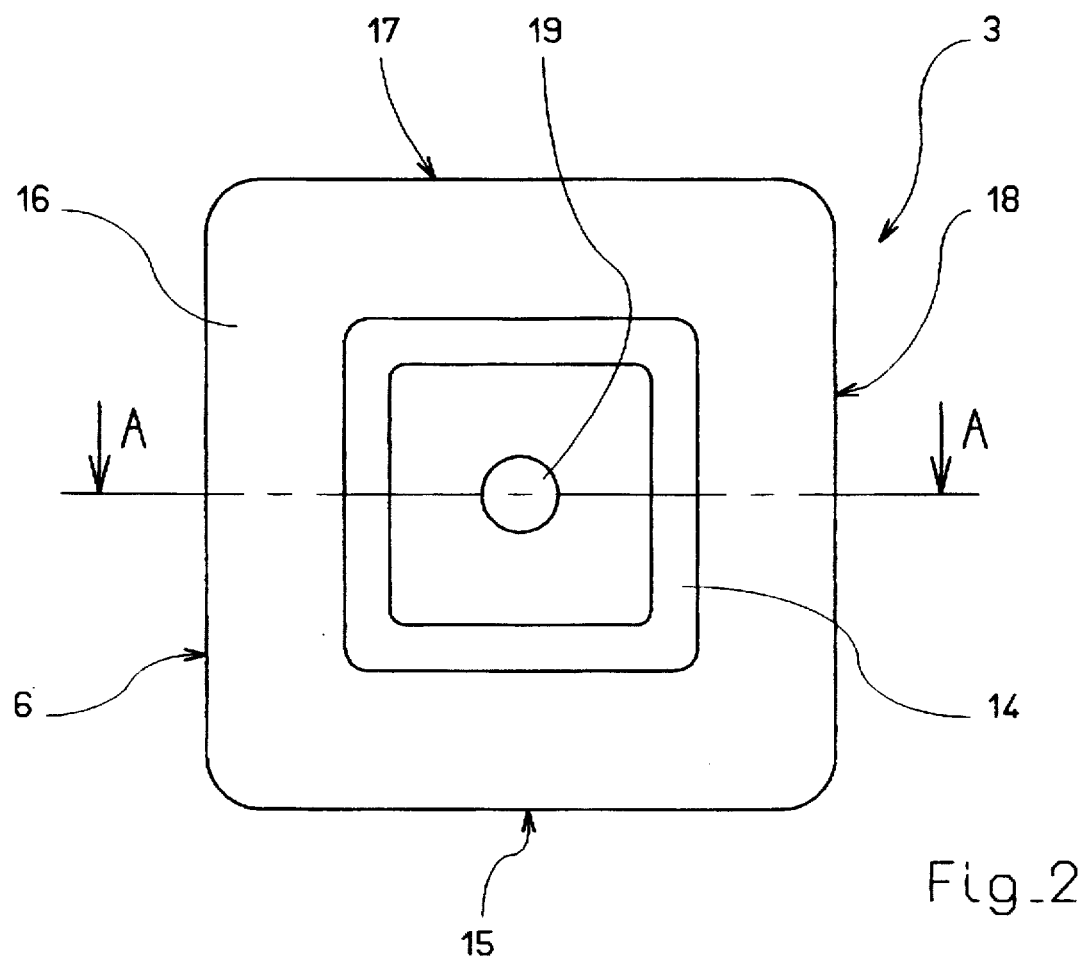
Fig_2
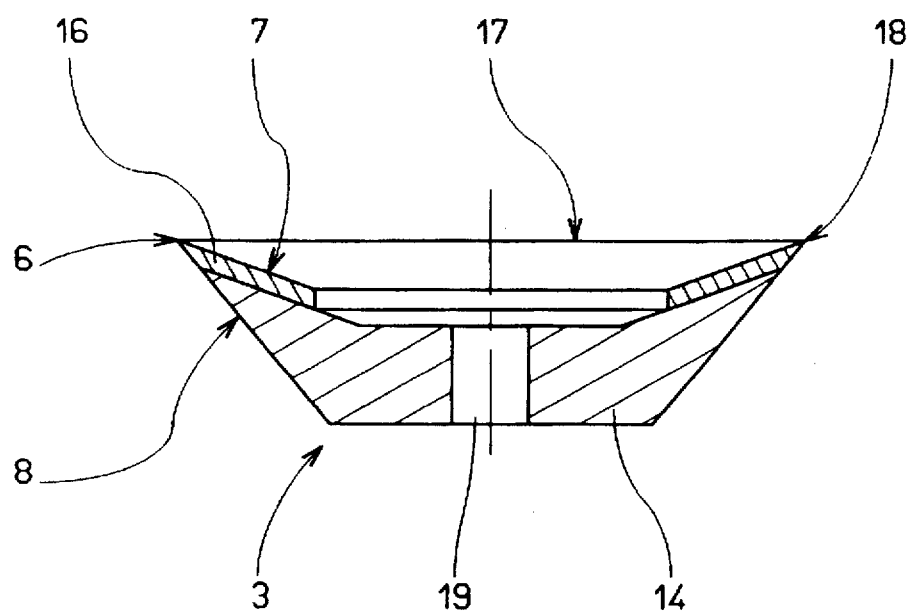
Fig_3

DEBARKING KNIFE AND METHOD OF MANUFACTURING IT

BACKGROUND OF THE INVENTION

1. Field of the Invention

The present invention concerns devices used for debarking tree-trunks.

2. Description of the Prior Art

Tree-trunks are debarked industrially by machines as described in document CA 2 078 355 A, for example, including tree-trunk support means for carrying a treetrunk on its side, moving it in longitudinal translation and rotating it about its longitudinal axis. Debarking knives having at least one debarking edge are pressed laterally against the lateral face of the tree-trunk at a fixed longitudinal position and with an appropriate orientation so that the debarking edge scrapes the bark from the trunk.

Machines of this kind require constant surveillance, in particular because of the wear of the debarking edge of the knives.

This wear progressively blunts the debarking edge and reduces its effectiveness. As a result the bark is incompletely removed, so reducing the quality of the wood for its subsequent use, for example in the manufacture of paper pulp.

It is therefore necessary to change the knives regularly, to renew the debarking edges of the machine.

Plates of a harder material or plates that have received a chemical vapor deposition (CVD) surface treatment, as described in document EP 0 319 926 A, by pressure phase deposition (PVD), by laser nitriding as described in document DE 38 08 285 A, by ionic nitriding, by blown plasma hard metal surface coating, or by high velocity oxidation (HVOF) have been used to increase the service life of certain tools for machining metals. These techniques have not been applied to knives for debarking tree-trunks and are not directly applicable to the particular geometry of debarking knives having a sharp edge.

The problem to which the present invention is addressed is that of conceiving a new debarking knife structure and a method for manufacturing it very substantially increasing the resistance to wear of the debarking edges and retaining the cutting qualities necessary for optimal operation of the debarking machine.

The basic idea of the invention consists in providing a composite structure for the debarking knife which, in use, is subject to progressive wear such that the appropriate geometry of the debarking edge is substantially conserved, whilst reducing the rate of wear of the debarking edge.

SUMMARY OF THE INVENTION

To achieve the above and other objects, a debarking knife for debarking tree-trunks in accordance with the invention comprises at least one sharp debarking edge delimited by a leading face and a trailing face, one face of a substrate plate forming said trailing face and said leading face being reinforced by an anti-abrasion hard surface coating having better anti-abrasion qualities than the material of said substrate plate. This composite structure with a leading face more resistant to abrasion causes a self-sharpening phenomenon which conserves the debarking edge geometry needed for satisfactory debarking efficiency. The self-sharpening phenomenon is explained by the different wear resistance of the substrate plate material and the anti-abrasion material hard surface coating. The leading face is much more highly loaded than the substrate. Although in a homogeneous debarking knife the wear causes rounding of the cutting edge, in a knife of the invention the different resistances of the materials conserves the geometry of the edge. Although less heavily loaded, the substrate wears due to friction at substantially the same rate as the edge consisting of the material more resistant to abrasion. The cutting profile of the knife is therefore conserved, which contributes to good debarking quality.

The anti-abrasion hard surface coating preferably has a regular thickness between about 0.2 mm and 1 mm.

The anti-abrasion hard surface coating can advantageously comprise a mixture of grains of fused tungsten carbide bound by a metal alloy. The grains of fused tungsten carbide preferably have a particle size range between 40 microns and 160 microns.

The metal alloy can advantageously be an Ni/Cr/B/Si alloy with a hardness between 40 HRC and 60 HRC.

An advantageous method of manufacturing a debarking knife of the above kind includes a step of hard surface coating said leading face by means of a device including a powder spray nozzle with central coaxial laser beam adapted to direct a hard surface coating material powder and said laser beam onto an impact area of said substrate plate and to progressively move said impact area to cover the debarking edge area to be hard surface coated, said laser beam having an appropriate intensity to melt said hard surface coating material partially and to cause it to adhere to said substrate plate.

Other objects, features and advantages of the present invention will emerge from the following description of particular embodiments of the invention given with reference to the accompanying drawings.

BRIEF DESCRIPTION OF THE DRAWINGS

FIG. 1 is a schematic end-on view of the essential components of a debarking machine.

FIG. 2 is a front view of a debarking knife constituting one embodiment of the present invention.

FIG. 3 is a section taken along the line A—A in FIG. 2.

DETAILED DESCRIPTION OF THE PREFERRED EMBODIMENTS

Figure 4A:
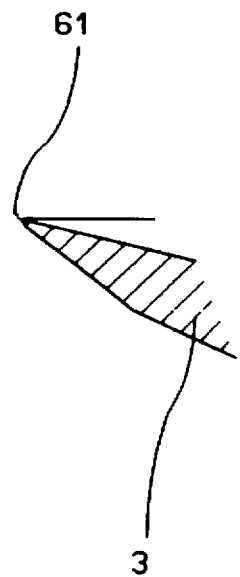
FIGS. 4A, 4B, and 4C show the progressive wearing away of a conventional homogenous debarking knife.

As shown in FIG. 1, a debarking machine generally comprises tree-trunk support means, not shown, for carrying a tree-trunk 1 on its side, moving it in longitudinal translation along its longitudinal axis and rotating it about its longitudinal axis, as shown by the arrow 2. A debarking knife 3 carried by a support 4 is pressed against the lateral surface 5 of the trunk 1. The debarking knife 3 has at least one debarking edge 6 delimited by a leading face 7 and a trailing face 8. The knife 3 is disposed so that the debarking edge 6 is substantially parallel to the longitudinal axis of the tree-trunk 1 and pressed radially against the lateral face 5 of the tree-trunk, with an appropriate orientation such that its leading face 7 is in a plane 9 at an acute angle (approximately 45°, for example) to the tangent 10 to the lateral surface 5 of the trunk 1 oriented towards the upstream end of the debarking area. The bark 11 therefore abuts against the leading face 7 of the debarking knife 3 and is separated from the surface 5 of the tree-trunk, breaking up into chips 12, as shown in the figure.

The knife 3 is fixed to the support 4 by any appropriate means such as a screw 13 inserted into a hole in the debarking knife 3.

The support 4 is adapted to press the debarking knife 3 radially and elastically against the lateral surface 5 of the tree-trunk 1, following the generally irregular shape of this lateral surface 5.

The double movement of axial rotation 2 and axial translation of the tree-trunk 1 is adapted to move the debarking knife 3 helically along all of the lateral surface 5 of the tree-trunk 1, to remove all of the bark 11.

In the embodiment of the invention shown in FIGS. 2 and 3 a substrate plate 14, for example a steel plate, forms the basic structure of the debarking knife 3. The substrate plate 14 may advantageously be delimited by a plurality of debarking edges forming a polygonal contour, for example three or four debarking edges. In the embodiment shown in the figure, the substrate plate 14 is delimited by four debarking edges 15, 6, 17 and 18, advantageously forming a square contour. The central part of the substrate plate 14 is provided with a hole 19 for fixing the debarking knife 3 to the support 4, as previously mentioned.

In the embodiment shown in FIGS. 2 and 3 the contour of the substrate plate 14 is raised in the direction towards the leading face 7, to form a substrate plate 14 with a concave upstream face, favoring guidance and evacuation of the chips 12.

The figures show that one face of the substrate plate 14 forms the trailing face 8 and that the leading face 7 is reinforced by an anti-abrasion hard surface coating 16 having better anti-abrasion qualities than the material (e.g. steel) of the substrate plate 14. The anti-abrasion hard surface coating has a regular thickness which can advantageously be between about 0.2 mm and 1 mm.

Good results are obtained by using a mixture of grains of fused tungsten carbide bound by a metal alloy such as an Ni/Cr/B/Si alloy for the anti-abrasion hard surface coating of a steel substrate plate 14.

Increases in service life in a ratio of 1 to 4 has been obtained with the following composition:

Ni/Cr/B/Si alloy of hardware 40 HRC: 50% fused tungsten carbide powder,
160 to 40 microns: 50%

This composition produces a very compact assembly of fused tungsten carbide grains, giving this coating exceptional resistance to wear.

The increase in resistance to wear is accompanied by a phenomenon of self-sharpening of the debarking edge, which retains satisfactory effectiveness even after significant wear of the knife.

Figure 4B:
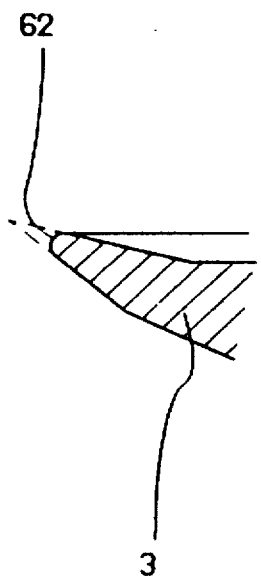
Figure 4C:
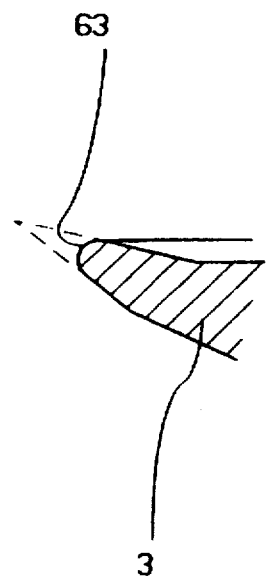

This self-sharpening phenomenon is explained with reference to FIGS. 4A, 4B, and 4C, and FIGS. 5A, 5B, and 5C. FIG. 4A, 4B, and 4C show a conventional debarking knife which initially has a sharp cutting edge 61. The cutting edge becomes progressively more rounded, as indicated by the reference number 62, and then extremely rounded, as indicated by the reference number 63. Obviously the rounded edge 63 is unable to carry out effective debarking, the bark tending to slide over the rounded edge 63.

Figure 5A:
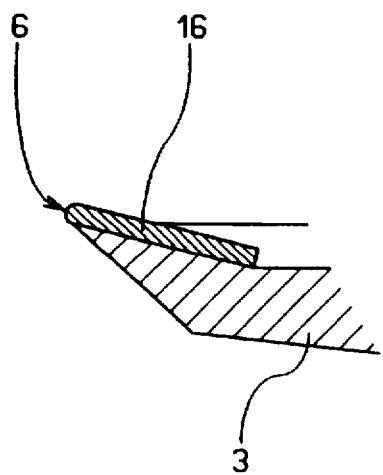
FIGS. 5A, 5B, and 5C show the progressive wearing away of a debarking knife in accordance with the present invention.
Figure 5B:
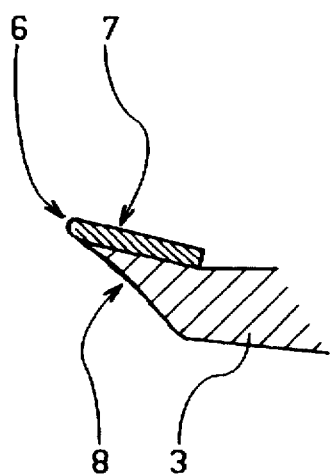
Figure 5C:
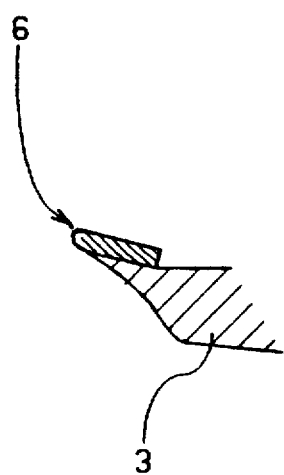

FIGS. 5A, 5B, and 5C show a debarking knife 3 of the invention with the debarking edge 6 with the anti-abrasion hard surface coating 16. In the course of time, the trailing face 8 which is of the softer material of the substrate tends to wear more easily than the leading face 7 of anti-abrasion material, so that the trailing face 8 remains at all times set back relative to the leading face 7, retaining a sharp geometry of the debarking edge 6, even after a long period of use leading to nonnegligible wear of the knife.

As a result the knife 3 can be used for much longer, since the wear of the knife is compensated by the movement of the support 4 towards the tree-trunk 1 during use.

The chemical flame hard surface coating technique cannot be used on an industrial basis to manufacture a debarking knife 3 of this kind. The flame is relatively extensive compared to the hard surface coated area and doesn't allow to localize the hard surface coating material supply precisely. This technique cannot produce a deposit of regular thickness either, which is necessary for obtaining a good cut. The quantity of alloy lost during a flame operation makes the latter uneconomic. Tests have shown a ratio of 1 to 10 between the weight of the mixture actually deposited and the weight of the mixture used for the deposition process. This leads to a non-negligible wastage of tungsten carbide.

In accordance with the invention, the manufacture of a debarking knife includes a step of hard surface coating the leading face 7 using a device comprising a powder sprayer nozzle with a central coaxial laser beam.

Figure 6:
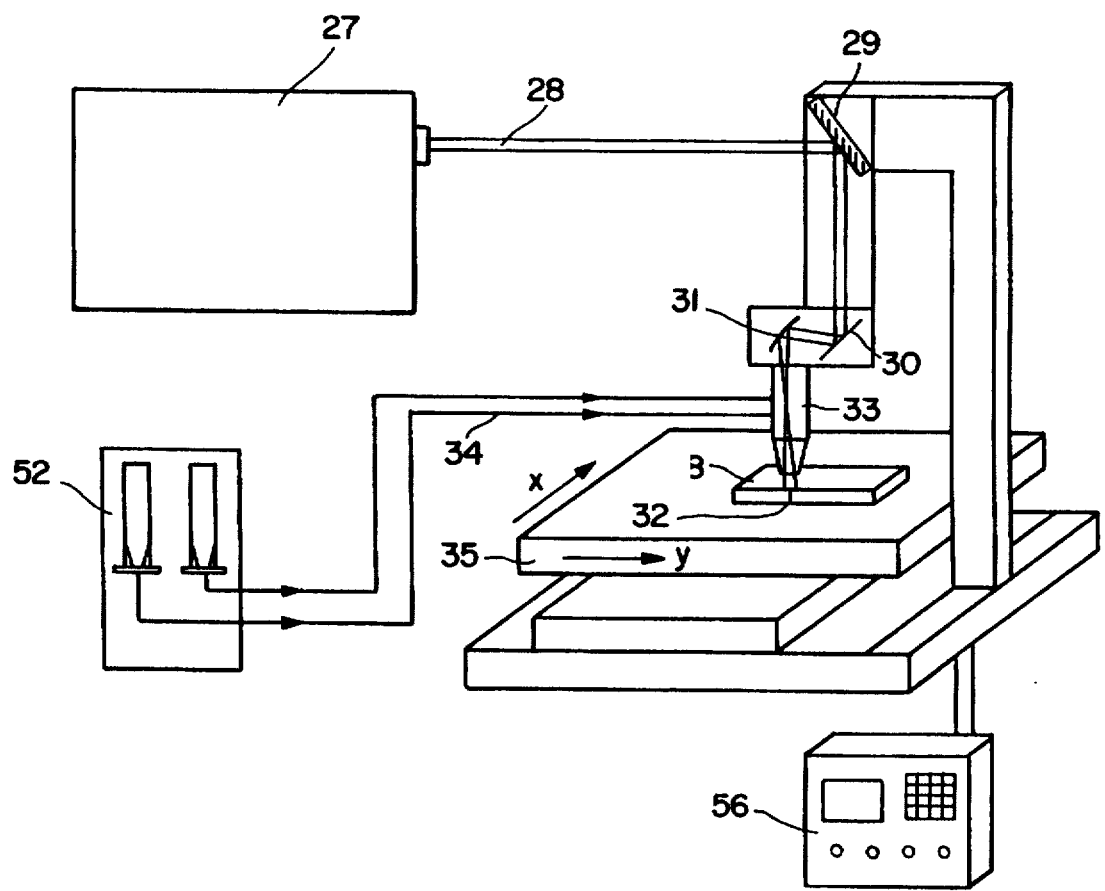
FIG. 6 is a schematic perspective view of a device for manufacturing debarking knives in accordance with the present invention.

FIG. 6 shows schematically a device of this kind that can be used to implement the invention. This device includes a power laser 27 which emits a coherent and monochromatic light beam 28. The beam 28 propagates in a single direction, homogeneously, and has only one wavelength. The divergence of the beam is slight.

A set of direction-changing mirrors 29 and 30 conveys the beam to a focusing head 31. The focusing head 31 directs the laser beam onto the surface of the debarking knife 3 to be hard surface coated. The focusing head 31 is adapted to focus the laser beam so that the latter impinges on the debarking knife 3 in a small impact area 32, for example a surface having a diameter between about 0.5 mm and 5 mm.

A powder distributor 52 serves as a reservoir containing a powdered material to form the hard surface coating on the plate forming the substrate of the debarking knife 3. This powder contains grains of hard anti-abrasion material which retain their solid state when exposed to the laser beam and grains of brazing alloy that are adapted to be melted by the laser beam. The powder distributor 52 is adapted to fluidize the powder by means of a neutral gas such as argon or helium and to convey it pneumatically to a spray nozzle 33 via powder feed pipes 34. The spray nozzle 33 is adapted to form the fluidized jet of powder at the outlet of the nozzle around the laser beam and to produce a nondivergent peripheral powder jet impinging on the same impact area 32 on the debarking knife 3. Thus the powder jet and the laser beam are coaxial.

The laser beam is oriented so that it is close to vertical to the surface of the debarking knife 3 to be hard surface coated. The outlet orifice of the nozzle 33 is held at an appropriate distance from the surface to the hard surface coated, for example about 10 mm.

The debarking knife 3 is placed on a table 35 which is moved in the horizontal plane in two directions X and Y by drive means controlled by a digital controller 56. By virtue of this movement, the area of impact 32 of the laser beam and the powder leaving the spray nozzle 33 is moved progressively over the surface of the debarking knife 3 to be hard surface coated, along the debarking edges.

The energy of the laser beam 28 melts the brazing alloy powder. The powder therefore reaches the surface of the debarking knife 3 to be hard surface coated in a partly molten state and brazes the grains of tungsten carbide to the substrate.

A $CO_2$ laser can be used in association with a manipulator table controlled for movement on two or three axes by a programmable digital controller.

The brazing is obtained instantaneously. Perfect focusing of the laser beam provides total control of the regularity of the deposited layer. The precision movements of the manipulator table produce a well controlled thickness and a very homogenous hard surface coating.

The present invention is not limited to the embodiments that have just been described but includes variants and generalizations thereof within the scope of the following claims.

There is claimed:

1. A debarking knife for debarking tree-trunks comprising at least one sharp debarking edge delimited by a leading face and a trailing face, one face of a substrate plate forming said trailing face and said leading face being reinforced by an anti-abrasion hard surface coating having better anti-abrasion qualities than the material of said substrate plate.

2. The debarking knife claimed in claim 1 wherein said anti-abrasion hard surface coating has a regular thickness between about 0.2 mm and 1 mm.

3. The debarking knife claimed in claim 1 wherein said anti-abrasion hard surface coating comprises a mixture of grains of fused tungsten carbide bound by a metal alloy.

4. The debarking knife claimed in claim 3 wherein said grains of fused tungsten carbide have a particle size range between 40 microns and 160 microns.

5. The debarking knife claimed in claim 3 wherein said metal alloy is an Ni/Cr/B/Si alloy having a hardness between 40 HRC and 60 HRC.

6. The debarking knife claimed in claim 1 wherein said substrate plate is made of steel.

7. The debarking knife claimed in claim 1 wherein said substrate plate is delimited by three or four debarking edges forming a polygonal contour.

8. A debarking machine comprising tree-trunk support means for carrying a tree-trunk on its side, moving it in longitudinal translation and rotating it about its longitudinal axis, and means for holding at least one debarking knife as claimed in claim 1 with its debarking edge pressed radially against the lateral face of the tree-trunk in an appropriate orientation.

9. A method of manufacturing a debarking knife in accordance with claim 1 and having at least one sharp debarking edge delimited by a leading face and a trailing face, one face of a substrate plate forming the trailing face, including a step of hard surface coating said leading face by means of a device including a powder spray nozzle with central coaxial laser beam adapted to direct a hard surface coating material powder and said laser beam onto an impact area of said substrate plate and progressively moving said impact area to cover the debarking edge area to be hard surface coated, said laser beam having an appropriate intensity to melt said hard surface coating material partially and to cause it to adhere to said substrate plate.

* * * * *